US012798631B2

(12) United States Patent
Theis et al.

(10) Patent No.: US 12,798,631 B2
(45) Date of Patent: Nov. 17, 2026

(54) FLOOR TRAY FOR BOARDING AIDS

(71) Applicant: Bode—Die Tür GmbH, Kassel (DE)

(72) Inventors: Christoph Theis, Bad Wildungen (DE); Marco Cimmino, Adelebsen (DE); Ulrich Arend, Dickershausen (DE); Diako Rasekhi Coochesfahani, Kassel (DE)

(73) Assignee: BODE—DIE TÜR GMBH, Kassel (DE)

( * ) Notice: Subject to any disclaimer, the term of this patent is extended or adjusted under 35 U.S.C. 154(b) by 403 days.

(21) Appl. No.: 18/419,034

(22) Filed: Jan. 22, 2024

(65) Prior Publication Data

US 2024/0253673 A1 Aug. 1, 2024

(30) Foreign Application Priority Data

Jan. 30, 2023 (DE) .................... 20 2023 100 417.2

(51) Int. Cl.
*B61D 23/00* (2006.01)
*B60R 3/02* (2006.01)
*B61D 23/02* (2006.01)
*B61D 47/00* (2006.01)

(52) U.S. Cl.
CPC ................ *B61D 23/00* (2013.01); *B60R 3/02* (2013.01); *B61D 23/025* (2013.01); *B61D 47/00* (2013.01)

(58) Field of Classification Search
CPC ...... B61D 23/025; B61D 23/00; B61D 23/02; B61D 47/00; B60R 3/02; B60R 3/007; B60R 3/002
See application file for complete search history.

(56) References Cited

U.S. PATENT DOCUMENTS

| | | | | |
|---|---|---|---|---|
| 5,393,192 A * | 2/1995 | Hall | B60P 1/431 296/61 |
| 10,279,764 B1 * | 5/2019 | Wymore | B60R 3/00 |
| 11,851,026 B2 * | 12/2023 | Fisher | B60R 3/02 |
| 2008/0184500 A1 * | 8/2008 | Bettcher | A61G 3/061 14/71.1 |

FOREIGN PATENT DOCUMENTS

| | | | | |
|---|---|---|---|---|
| CN | 112046516 A * | 12/2020 | B61D 23/00 |
| CN | 112977508 A | 6/2021 | |
| DE | 20318186 U1 * | 7/2004 | B60P 1/433 |
| DE | 102014207349 B4 * | 1/2022 | B61D 23/025 |
| EP | 1535592 B1 | 2/2007 | |
| EP | 1916156 A2 * | 4/2008 | B61D 23/025 |
| EP | 1916156 B1 | 12/2009 | |
| KR | 100751529 B1 * | 8/2007 | B61D 17/22 |
| KR | 20140144385 A * | 12/2014 | B60R 3/02 |
| WO | WO-2013053596 A1 * | 4/2013 | B61D 23/025 |

* cited by examiner

*Primary Examiner* — Cheng Lin
(74) *Attorney, Agent, or Firm* — CANTOR COLBURN LLP

(57) ABSTRACT

A floor tray for a boarding aid, in particular a sliding step, of a vehicle includes a bottom plate and at least three side walls arranged perpendicular to the bottom plate and connected to one another in a U-shape, wherein the bottom plate and the side walls are connected together impermeable to liquid, and the floor tray is designed to accommodate the boarding aid between two opposite side walls and on the bottom plate.

11 Claims, 2 Drawing Sheets

FLOOR TRAY FOR BOARDING AIDS

CROSS-REFERENCE TO RELATED APPLICATIONS

This application claims the benefit of German patent application 20 2023 100 417.2, filed on 30 Jan. 2023, the disclosure of which is incorporated herein by reference in its entirety.

TECHNICAL FIELD

The disclosure relates to a floor tray for a boarding aid for a vehicle, in particular a rail vehicle, to prevent the penetration of water from the boarding aid into the vehicle.

BACKGROUND

Boarding aids are frequently used in short-distance passenger transport vehicles, such as for example in rail vehicles or buses. The boarding aids bridge the gap between rail vehicle and platform or form an access ramp to facilitate boarding into the vehicle. The boarding aids comprise for this purpose a step surface mounted so as to be extendable onto a frame. This step surface is usually extended laterally from the vehicle. The step surface is exposed to dirt and liquids, such as rain for example, during its use. If the wet or dirty step surface is retracted again into the vehicle, the water and the dirt drops into the interior of the vehicle.

In order to prevent soiling or possible damage to the vehicle due to the entry of water, boarding aids have for a long time been manually sealed. This involves closing the underside of the boarding aid with a bottom plate and the sealing of the opening in the frame of the boarding aid. For this purpose, the openings are closed with a sealing compound or an adhesive. The boarding aid then undergoes a tightness test and any leakages are again reworked.

This approach is laborious and susceptible to faults, so that it is the problem of the disclosure to provide improved sealing of the boarding aid with respect to the vehicle.

SUMMARY

This problem is solved by the devices and methods with the features of the independent claims. The respective dependent claims disclose further, particularly advantageous embodiments of the disclosure.

A floor tray according to the disclosure is suitable for a boarding aid of a vehicle. In particular, the boarding aid is constituted as a sliding step, with which a step surface is mounted so as to be extendable in a frame. Such boarding aids are often used in buses or trains, so that the floor tray can be used in particular for boarding aids in rail vehicles. The floor tray according to the disclosure is characterised by a bottom plate and at least three side walls arranged perpendicular to the bottom plate and connected to one another in a U-shape, wherein the bottom plate and the side walls are connected together impermeable to liquid, and the floor tray is designed to accommodate the boarding aid between two opposite side walls and above the bottom plate.

When the step surface is extended, the boarding aid spans a cuboidal installation space, which is essentially determined by the dimensions of the frame. The installation space comprises an upper side, a lower side lying opposite the upper side, and four side walls connecting the upper side to the lower side. The step surface can be extended through one of the side walls. As a rule, the distance between the upper side and the lower side is very much smaller than the width and the length of the upper side and respectively the lower side which are equal in size.

The floor tray comprises a bottom plate and three side walls, so that the floor tray forms a tray which is open upwards and open to one side, whereas the tray is closed downwards and to three sides. Two of the side walls are arranged lying opposite one another, whilst the third side wall lies opposite an open side face. The side walls are connected together at the contact points and to the bottom plate at the contact points impermeable to liquid. The side walls together form a shape open to one side, such as for example a U-shape. All the side walls and the three legs of the U-shape can be formed from straight planes, or for example the side wall, which connects the two side walls arranged lying opposite one another, can be curved.

Insofar as the floor tray comprises a plurality of parts, the contact points can be welded, glued or sealed with a sealant in a manner impermeable to liquids. The tray can however also be produced in a deep-drawing process, or in a casting process. A combined edging and welding process is also conceivable, in which the side walls connected to the bottom plate are cut out of a base plate and are erected perpendicular to the bottom plate by an edging process, wherein the connection points of the side walls to one another are then connected together in a manner impermeable to liquids by a welding process. It is important that the floor tray, for its part, is constructed impervious to liquids also without the presence of the boarding aid.

In the assembled state, the boarding aid is arranged on the bottom plate and between the two side walls lying opposite one another. The bottom plate closes off the boarding aid towards the bottom and to three sides so as to be impermeable to liquids. A side of the boarding aid remains open, so that a step surface of the boarding aid can be extended at this side.

The floor tray is designed to be connected to the vehicle. For this purpose, the floor tray can be screwed, glued or welded to the vehicle.

No liquids can pass from the floor tray into the vehicle from the bottom plate in the direction of the vehicle and from the side walls in the direction of the vehicle. For this purpose, it may be advantageous if the floor tray for the vehicle can be inserted with sealant into the vehicle, in particular in the edge regions of the floor tray, for example with a seam of sealant, such as for example silicone or a construction adhesive. The edge region of the contact region between the floor tray and the vehicle can thus also easily be sealed after assembly of the floor tray.

In an embodiment of the floor tray, the floor tray is thus designed such that liquids which drip down from the boarding aid due to gravity are caught in the floor tray. The step surface of the boarding aid is exposed to rain and dirt above all in bad weather, so that liquids and dirt are carried by the step surface into the boarding aid and thus also into the vehicle. These liquids and this dirt can drop down from the boarding aid due to the force of gravity and can also be distributed to a certain extent to the side by the occurring centrifugal forces during operation of the vehicle. In order that the liquid and the dirt do not spread in the vehicle, the liquid and the dirt is caught in the floor tray.

In particular, the floor tray is designed to channel off the liquids caught by the floor tray into the external surroundings of the vehicle. For this purpose, the open side of the floor tray can be arranged flush with the outer shell of the vehicle, and preferably inclined in the direction of the open side of the floor tray, so that the liquid can run off from the floor tray into the surroundings outside the outer shell of the vehicle.

It is however also conceivable that the floor tray comprises a drainage for draining liquids caught in the floor tray. Such a drainage can comprise a hose or a pipe connection, which is connected to the floor tray. The drainage can lead into surroundings outside the vehicle or outside the vehicle shell, so that the liquid can flow away there. For better removal of the liquid, the bottom plate of the floor tray can constitute a form of funnel, to the spout of which the drain is connected.

In a further embodiment of the floor tray, the floor tray comprises an upwardly pointing opening for accommodating the boarding aid. The boarding aid can be inserted and assembled through the opening from above into the floor tray even after the assembly of the floor tray in the vehicle.

It is however also conceivable that the boarding aid can be inserted through an opening of the floor tray pointing to the side during the assembly in the floor tray into the latter. This side opening can then subsequently be used to enable the retraction and extension of the step surface of the boarding aid.

In a further embodiment of the floor tray, the floor tray can comprise a cover plate arranged lying opposite the bottom plate. The cover plate can be connected to the frame of the boarding aid and/or to the floor tray. It may be advantageous if the cover plate is connected to the side walls of the floor tray so as to be impermeable to liquids.

In this way, no liquid can leave the floor tray upwards in the direction of the vehicle for example as water vapour or condensation water. The floor tray then forms together with the cover plate a cuboidal, in particular rectangular, container closed off in five directions, wherein only one side of the cube remains open for the retraction and extension of the step surface. The open side can be arranged flush with the outer shell of the vehicle, and be connected to the vehicle impermeable to liquids, so that no fluid whatsoever can escape from the floor tray in the direction of the vehicle.

A subassembly comprising a boarding aid with an inventive floor tray is also in accordance with the disclosure, wherein the boarding aid comprises a frame and a step surface mounted so as to be extendable in the frame, wherein the boarding aid is closed off impermeable to liquid by the floor tray at at least four sides. The floor tray can in particular be fastened to the frame of the boarding aid. The fastening can take place by means of screw connections, and/or adhesive connections and/or welded connections.

A rail vehicle with a boarding aid with an inventive floor tray is also accordance with the disclosure, wherein the floor tray separates the boarding aid from the vehicle in such a way that liquids which drip down from the boarding aid due to the force of gravity are caught in the floor tray.

In particular, the floor tray is designed in such a way that liquids caught by the floor tray are channeled off into the external surroundings of the vehicle.

A method for the liquid-impermeable assembly of a boarding aid in a vehicle is also in accordance with the disclosure, wherein the method comprises the following steps:

a) provision of at least one floor tray impermeable to liquids on at least four sides according to the claims, And one of the process steps b.1) or b.2):

b.1) assembly of the floor tray in the vehicle, and subsequent assembly of the boarding aid in the floor tray, or b.2) assembly of the boarding aid in the floor tray and assembly of the subassembly comprising the floor tray and the boarding aid in the vehicle.

Since the conventional sealing of a boarding aid as described at the outset is very time-consuming and prone to error, the use of a floor tray according to the disclosure offers a good solution. The floor tray can for example already be assembled in the vehicle and the boarding aid can be assembled in a subsequent step without sealing measures or sealing tests. Since the floor tray for its part is already impermeable to liquids, no leakage due to faulty assembly of the boarding aid can occur.

Provision can also be made such that the boarding aid is first assembled with the floor tray to form a subassembly and the subassembly is assembled in the vehicle in a subsequent step. Since in this case the floor tray is for its part already provided impermeable to liquids, the fault-prone sealing steps are no longer required in the assembly of the boarding aid.

BRIEF DESCRIPTION OF THE DRAWINGS

The present disclosure is explained below in detail with the aid of examples of embodiment making reference to the appended figures. In the figures.

DETAILED DESCRIPTION OF THE DRAWINGS

In the figures, the same reference numbers denote the same components or components corresponding to one another with the same function—unless indicated otherwise.

Figure 1:
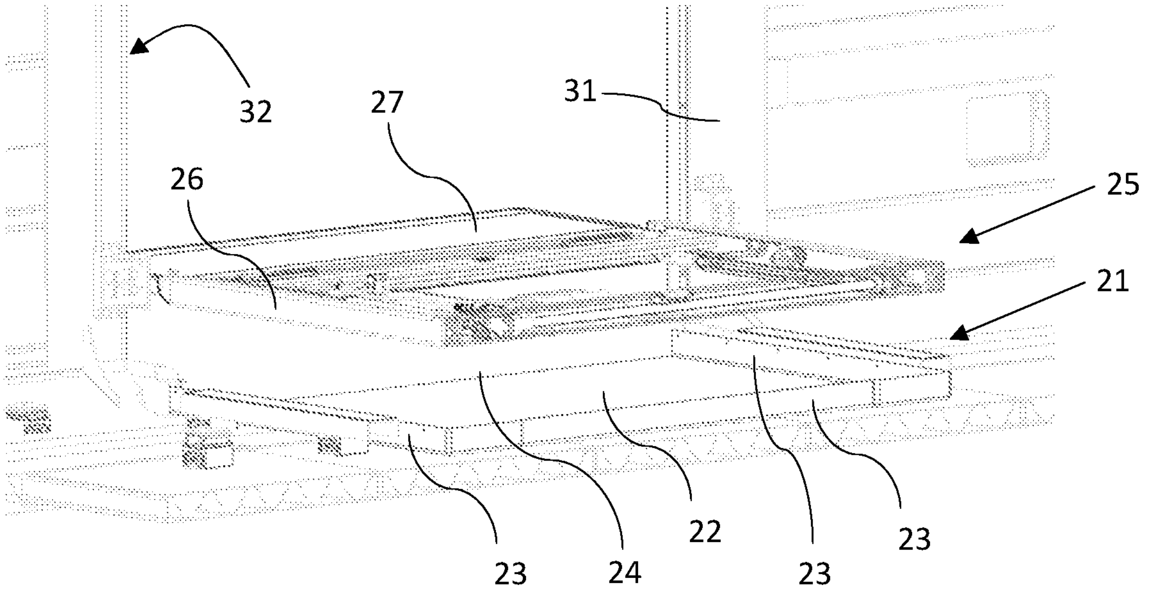
FIG. 1 shows a floor tray assembled in a vehicle.

FIG. 1 shows a floor tray 21 assembled in a vehicle 31. A boarding aid 25 is represented above floor tray 21, which is arranged in floor tray 21 in the next assembly step.

Vehicle 31 is a rail vehicle, wherein vehicle 31 is in a partially pieced-together stage during the assembly. For example, the floor of vehicle 31 is absent in this stage, under which the floor tray together with boarding aid 25 disappears in the normal operation.

Boarding aid 25 is a sliding step with a frame 26, which serves as a support for a step surface 27. Step surface 27 is mounted in frame 26 so as to be extendable and can be retracted or extended on one side. In the figures, step surface 27 is represented in an extended state.

Floor tray 21 comprises a bottom plate 22 and three side walls 23, wherein two of side walls 23 are arranged lying opposite and are connected to one another by third side wall 23. Side walls 23 are arranged perpendicular on bottom plate 22 and connected to the latter fixedly and liquid-impermeable. This also applies to the contact points of side walls 23 with one another. One side of bottom tray 21 is constituted open. Step surface 27 of boarding aid 25 can be retracted and extended through this open side 24.

Floor tray 21 can catch liquids which drip down from step surface 27 or boarding aid 25, so that the liquid cannot reach regions of the vehicle lying beneath floor tray 21. Side walls 23 also prevent the liquid from passing laterally over bottom plate 22 into vehicle 31 due to lateral accelerations occurring during operation of vehicle 31.

Open side 24 is arranged flush with outer shell 32 of vehicle 31, so that the liquid caught by floor tray 21 can be channeled away via open side 24 of floor tray 21 into the external surroundings of outer shell 32 of vehicle 31.

Figure 2:
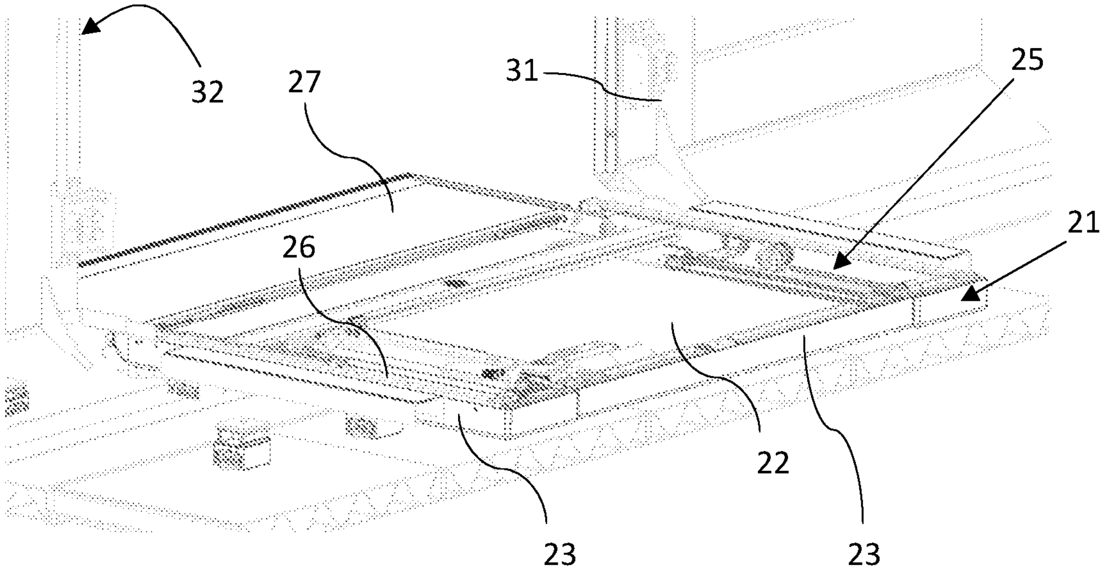
FIG. 2 shows the floor tray from FIG. 1 with a boarding aid assembled therein.

Boarding aid 25 is assembled in floor tray 21 in FIG. 2. Step surface 27 is extended through open side 24 of floor tray 21 and over outer shell 32.

Figure 3:
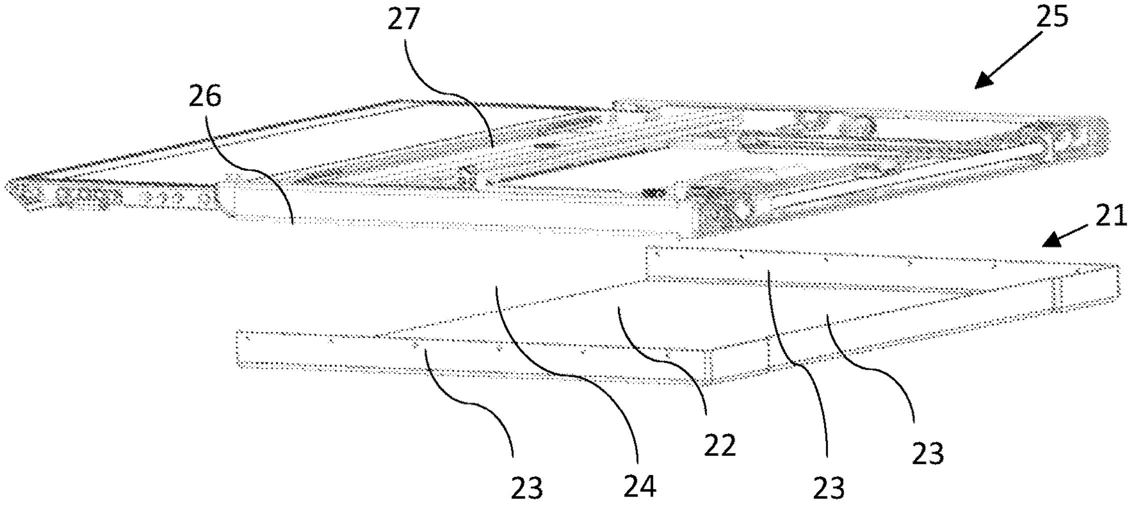
FIG. 3 shows the floor tray and the boarding aid from FIG. 1 in a detail drawing.

FIG. 3 shows once again floor tray 21 and boarding aid 25 in a detail drawing. Extended step surface 27 of boarding aid 25 can clearly be seen. One of the side walls 23 is adapted to frame 26 of boarding aid 25 and therefore has formations at the two ends which follow the contour of frame 26 of boarding aid 25.

Figure 4:
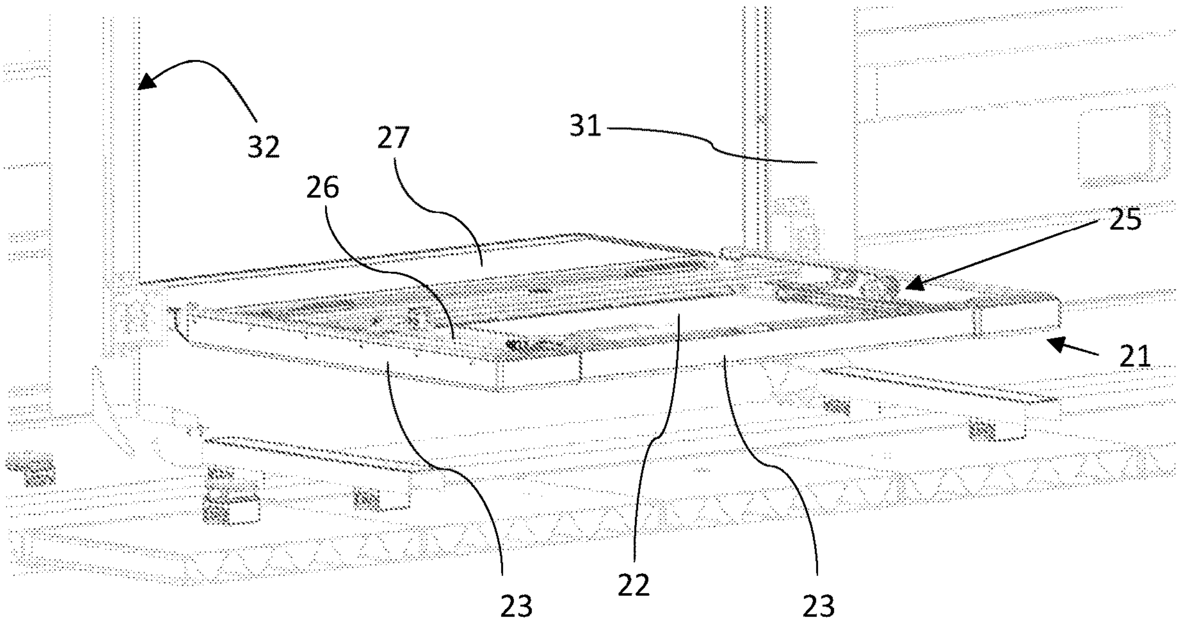
FIG. 4 shows a subassembly comprising a floor tray and a boarding aid prepared for the assembly in a vehicle.

FIG. 4 shows a subassembly comprising a floor tray 21 and a boarding aid 25, which is preassembled for installation in vehicle 31. Floor tray 21 is fastened fixedly to frame 26 of boarding aid 25 and connects boarding aid 25 at four sides (lower and three vertical sides) in a liquid-impermeable manner. Open side 24 points in the direction of outer shell 32 or the door opening and is arranged flush with outer shell 32 in a subsequent step.

The invention claimed is:

1. A floor tray for a boarding aid of a vehicle,
the floor tray comprising a bottom plate and at least three side walls arranged perpendicular to the bottom plate and connected to one another in a U-shape, wherein the bottom plate and the side walls are connected together impermeable to liquids, and the floor tray is designed to accommodate the boarding aid between two opposite side walls and on the bottom plate, further comprising a frame and a step surface mounted so as to be extendable in the frame, wherein the boarding aid is closed off impermeable to liquids at at least four sides by the floor tray, wherein the floor tray is fastened to the frame of the boarding aid.

2. The floor tray according to claim 1,
wherein
the floor tray is designed such that liquids which drip down from the boarding aid due to the force of gravity are caught in the floor tray.

3. The floor tray according to claim 1,
wherein
the floor tray is designed to channel off the liquids caught by the floor tray into the external surroundings of the vehicle.

4. The floor tray according to claim 2,
wherein
the floor tray comprises a drainage for draining liquids caught in the floor tray.

5. The floor tray according to claim 1,
wherein
the floor tray comprises an upwardly pointing opening for accommodating the boarding aid.

6. The floor tray according to claim 1,
wherein
the floor tray comprises an opening pointing to the side for accommodating the boarding aid.

7. The floor tray according to claim 1,
wherein
the floor tray comprises an opening which enables a retraction and extension of a step surface of the boarding aid.

8. The floor tray according to claim 1,
wherein
the floor tray comprises a cover plate arranged lying opposite the bottom plate.

9. A rail vehicle with a boarding aid with a floor tray according to claim 1,
wherein
the floor tray separates the boarding aid from the vehicle in such a way that liquids which drip down from the boarding aid due to the force of gravity are caught in the floor tray.

10. The rail vehicle according to claim 9,
wherein
the floor tray is configured such that liquids caught by the floor tray are channelled off into the external surroundings of the rail vehicle.

11. A method for the liquid-impermeable assembly of a boarding aid in a vehicle, the method including the following steps:

a) providing a floor tray impermeable to liquids on at least four sides according to claim 1, and b) assembling the boarding aid in the floor tray and assembly of the subassembly comprising the floor tray and the boarding aid in the vehicle.

* * * * *